Feb. 9, 1937. C. A. CAMPBELL 2,069,914
AIR BRAKE
Filed May 29, 1936
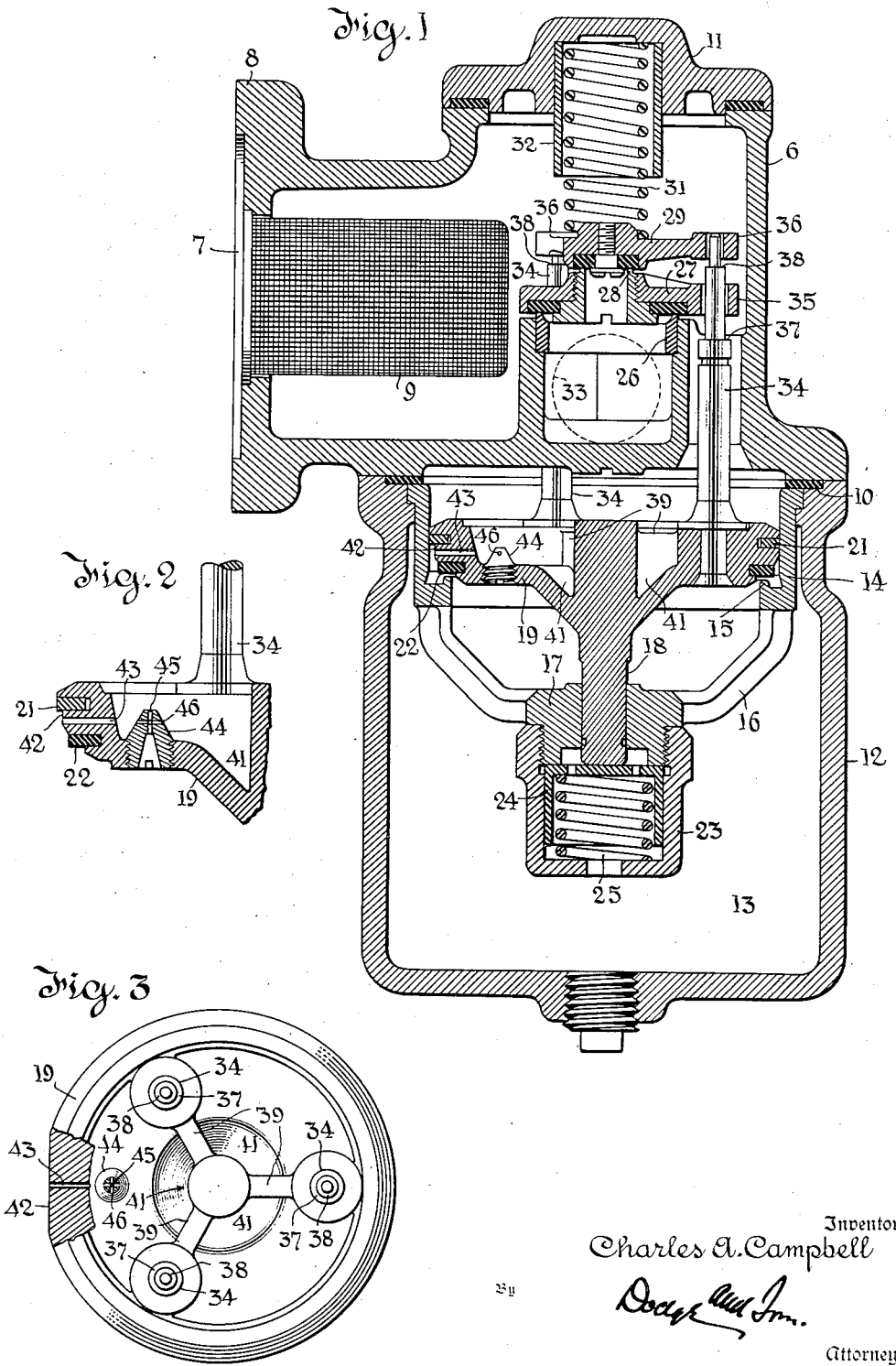
Inventor
Charles A. Campbell
Attorneys Patented Feb. 9, 1937

2,069,914

UNITED STATES PATENT OFFICE 2,069,914

AIR BRAKE

Charles A. Campbell, Watertown, N. Y., assignor to The New York Air Brake Company, a corporation of New Jersey Application May 29, 1936, Serial No. 82,613

4 Claims. (Cl. 303—1)

This invention relates to air brakes, and particularly flow controlling chokes and means for keeping such chokes clean.

While generally useful in any case where a metering choke is used in conjunction with a bypass or other flow port so arranged as to supply a cleaning air jet, the invention was developed for use in vent valves or quick action valves and will be described as used in a vent valve of the type disclosed in the patent to Campbell No. 1,938,738, issued December 12, 1933.

In the drawing,—

Fig. 1 is a vertical axial section through such a vent valve with the invention incorporated.

Fig. 2 is a fragmentary view showing a portion of Fig. 1 with the metering choke in axial section.

Fig. 3 is a plan view of the piston partly broken away to show the bypass which directs the cleaning jet against the choke.

In the drawing, the body of the vent valve comprises a housing 6 with brake pipe connection 7 having bolting flange 8 and screen 9. A removable cap 11 closes an opening in the top of housing 6. Bolted to housing 6 is a cup-like shell 12 enclosing the balancing chamber 13 (sometimes called a quick action chamber).

Clamped between body 6 and shell 12 and sealed by gasket 10 is cylinder bushing 14 with sealing rim 15 and pendant yoke 16, which last carries hub 17. Hub 17 serves as a guide for stem 18 of emergency piston 19, the piston working in bushing 14 and having a metallic packing ring ("snap ring") 21. Piston 19 also carries a rubber or like gasket 22 which seals on rim 15 in the lowermost position of the piston.

A cup 23 threaded on hub 17 guides a shiftable stop 24 urged upward by spring 25 so that it normally engages the lower face of hub 17. The parts are so dimensioned that in the uppermost position of the stop 24, the stop engages stem 18 and holds piston 19 in such position that gasket 22 clears rim 15, but the piston may be forced down against the resistance of spring 25 until the gasket seals on the rim.

In housing 6 is an upstanding annular valve seat 26 on which seats the main vent valve 27. Valve 27 has a central port surrounded by seat 28 on which seals the pilot vent valve 29. A coil compression spring 31 seated within cup 32 carried by cap 11 reacts downward on valve 29 and hence tends to seat both valves. An atmospheric port, indicated in dotted lines as 33, leads from the space within seat 26.

Piston 19 carries three upstanding pins 34 which pass through wings 35 and 36 on valves 27 and 29 respectively. Pins 34 are shouldered at 37 and 38, the shoulders being so spaced that piston 19 first moves a short distance idly, then engages and unseats valve 29 and on further upward movement facilitated by the opening of valve 29 unseats valve 27.

The mechanism so far described conforms generally to the disclosure of the prior patent above identified. Important features of novelty will now be pointed out.

Piston 19 is conical in section and in its upper face is divided by three radial webs 39 into three pockets 41 out of the path of air currents and hence adapted to collect any dust or scale that may be present.

Below ring 21 the periphery of piston 19 is cut back to form a segmental clearance 42 (see particularly Fig. 3) and from this clearance leads a generally radial breather port 43. Air discharging in a radially inward direction from this port impinges upon the upper projecting conical end of choke plug 44. Plug 44 has an axial bore 45 and near its upper end four radial passages 46 each preferably of the same diameter as the radial bore, so that the axial bore, below said radial ports, performs the metering function.

Operation

In charging the system at normal rates of brake pipe rise, the parts assume the position shown in Fig. 1, and charging flow to chamber 13 is through bypass 43 and choke plug 44 in parallel.

If brake pipe pressure rises more rapidly, say at the rate encountered in the leading twenty cars or so, piston 19 overpowers spring 25 and gasket 22 seals on rim 14 so that charging flow to chamber 13 is limited to the capacity of choke in plug 44. This protects against overcharge and when the pressure differential on piston 19 diminishes sufficiently piston 19 will resume the position of Fig. 1.

During reductions of brake pipe pressure at service rates piston 19 may rise idly until shoulders 38 engage wings 36. Port 43 and choke in plug 44 then permit back flow from chamber 13 to the brake pipe at such rate that pressure in chamber 13 falls at a service rate.

Since the air jet discharging through port 43 impinges directly on the projecting upper end of choke plug 44, the upper end of the plug and consequently the radial passages 46 are swept free of dust and scale, and any other foreign matter which would tend to clog the choke. The pockets 41 tend to collect any dust so dislodged.

The cleaning action above described occurs on every service reduction and even more actively on emergency reductions.

In emergency reductions the brake pipe is suddenly vented, so that the piston 19 moves up full stroke unseating valves 29 and 27 to complete the venting. The effective pressure causing flow through port 43 is then at its maximum value, so that flow is rapid and the scouring action is pronounced.

As stated, the invention is capable of embodiment in specifically different brake valves in which a metering choke and a bypass or other port are capable of arrangement to effect the cleaning function.

What is claimed is,—

1. In a fluid pressure brake system, the combination of means forming a flow controlling choke, and a bypass therearound distinct therefrom; and pressure responsive means for opening and closing the bypass, the parts being so arranged that the choke controls the rate of flow when the bypass is closed, and flow through the bypass exercises a cleaning action on the choke when the bypass is open.

2. In a fluid pressure brake system, the combination of means forming a chamber subject to brake pipe pressure; a reservoir; a shiftable piston interposed between said chamber and reservoir; a choke fitting for limiting flow between said chamber and reservoir; means forming a bypass also between said chamber and reservoir; and means operable by motion of said piston for opening and closing said bypass, the bypass being arranged to direct air discharging therefrom against a portion of said choke fitting to clean the same.

3. In a fluid pressure brake system, the combination of means forming a chamber subject to brake pipe pressure; a reservoir; a shiftable piston interposed between said chamber and reservoir; a choke fitting mounted in said piston for limiting flow from said chamber to said reservoir, said fitting having a projecting entrance end on the chamber side of said piston; and means forming a bypass through said piston around said choke, said bypass being opened and closed by the shifting of said piston and being arranged to direct air flowing from the reservoir through the bypass against the projecting end of said choke fitting.

4. In a fluid pressure brake, the combination of means forming a chamber subject to brake pipe pressure; a reservoir; a piston interposed between said chamber and reservoir and shiftable in a substantially vertical direction, said piston having in its upper face at least one collecting pocket; a choke fitting mounted in said piston for limiting flow of air from said chamber to said reservoir, said fitting having a projecting entrance end within and above the bottom of such pocket; and means forming a bypass through said piston said bypass being opened and closed by shifting of the piston and being arranged when open to direct air flowing from the reservoir substantially horizontally against the projecting end of said choke fitting, to clean the same.

CHARLES A. CAMPBELL.